(12) United States Patent
Takita

(10) Patent No.: US 7,710,465 B2
(45) Date of Patent: May 4, 2010

(54) IMAGE CAPTURING APPARATUS WITH CLARITY SENSOR, UNDERWATER IMAGE COMPENSATION AND UNDERWATER FLASH COMPENSATION

(75) Inventor: Mark Takita, Menlo Park, CA (US)

(73) Assignee: Nikon Corporation, Tokyo (JP)

( * ) Notice: Subject to any disclaimer, the term of this patent is extended or adjusted under 35 U.S.C. 154(b) by 503 days.

(21) Appl. No.: 11/645,299

(22) Filed: Dec. 22, 2006

(65) Prior Publication Data

US 2008/0151057 A1 Jun. 26, 2008

(51) Int. Cl.
*H04N 5/228* (2006.01)
(52) U.S. Cl. ............... 348/222.1; 348/81; 348/122; 348/370; 348/373
(58) Field of Classification Search ............ 348/222.1, 348/223.1–225.1, 236, 370, 371, 373–375
See application file for complete search history.

(56) References Cited

U.S. PATENT DOCUMENTS

| | | | |
|---|---|---|---|
| 5,365,290 A | | 11/1994 | Suzuki et al. |
| 5,438,363 A | | 8/1995 | Ejima et al. |
| 5,719,715 A | * | 2/1998 | Westhaver ............... 359/885 |
| 5,826,113 A | * | 10/1998 | Nonaka ................... 396/25 |
| 2004/0041941 A1 | | 3/2004 | Takeshita |
| 2005/0195290 A1 | | 9/2005 | Takeshita |
| 2005/0264685 A1 | | 12/2005 | Hoshuyama |
| 2006/0114335 A1 | * | 6/2006 | Hara et al. ............. 348/223.1 |

FOREIGN PATENT DOCUMENTS

JP 2004-282460 10/2004

OTHER PUBLICATIONS

Olympus USA America, Olympus Stylus 770 SW Goes Where No Other Digital Point-And-Shoot Camera Has Gone Before, Jan. 25, 2007, p. 1-5, http://www.olympususamerica.com/cpg_section/cpg_PressDetails.asp?pressNo=524, CenterValley, PA, United States.
The Nikon Guide to Digital Photography with the D2x Digital Camera by Nikon Corporation. The D2x digital camera was released on Feb. 25, 2005.

(Continued)

*Primary Examiner*—Gevell Selby
(74) *Attorney, Agent, or Firm*—Roeder & Broder LLP

(57) ABSTRACT

An image capturing apparatus (210) for providing an image (214) of a scene (12) that is within a fluid (16) includes an apparatus frame (228), a capturing system (230), and a control system (236). The capturing system (230) captures a captured image (614A). The control system (236) adjusts a color content of the captured image (614A) based on a clarity of the fluid (16). The image capturing apparatus (210) can include a clarity sensor (227) that provides a clarity signal that corresponds to the clarity of the fluid (16) near the image capturing apparatus (210). Moreover, the image capturing apparatus (210) can include an illumination system (724) that generates a generated light beam (726) that can be adjusted to compensate for the light that is attenuated by the fluid (16).

42 Claims, 10 Drawing Sheets

OTHER PUBLICATIONS

Proceedings of the 2004 IEEE Computer Society Conference on Computer Vision and Pattern Recognition (CVPR'04) 1063-6919/04.

Model No. GM 5WA06200Z by SHARP—Built-in 3-chip, Super-luminosity Chip LED, as of Apr. 2001.

http://optics.org/aticles/news/10/10/14/1 Dated Dec. 10, 2004, Lamina Ceramics LED array.

Luxeon Flash LXCL-PWF1—Technical Datasheet DS49. Dated Nov. 12, 2004, Lumileds Future Electronics.

* cited by examiner

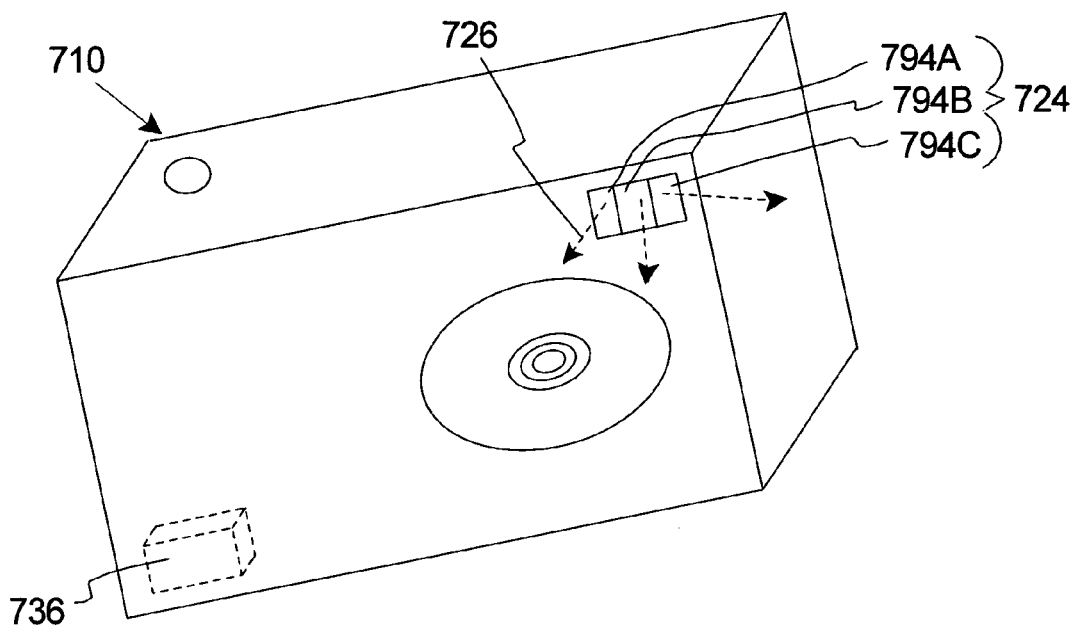
Fig. 7
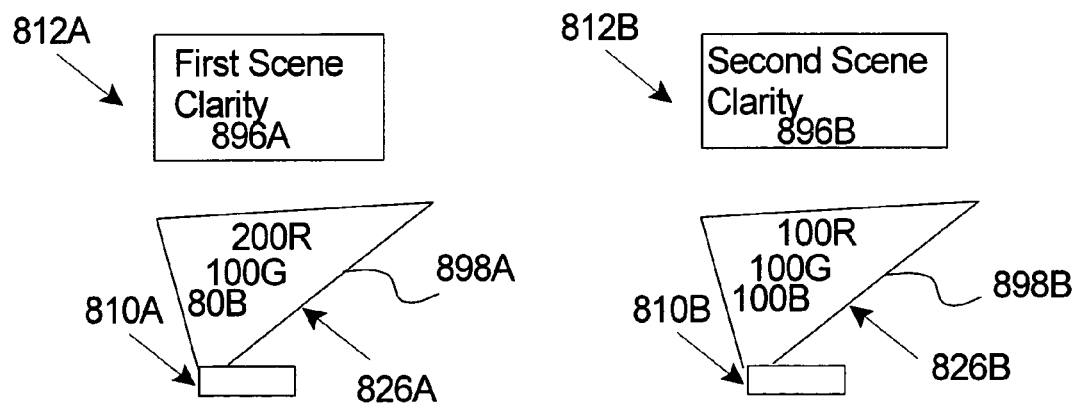
Fig. 8A
Fig. 8B

592

IMAGE CAPTURING APPARATUS WITH CLARITY SENSOR, UNDERWATER IMAGE COMPENSATION AND UNDERWATER FLASH COMPENSATION

BACKGROUND

Cameras are commonly used to capture an image of a scene. Additionally, some cameras are waterproof and are used to capture an image of a scene that is underwater.

It is well known that water absorbs longer wavelength light more rapidly then shorter wavelength light. As a result, underwater, at shallow depths, red structures in the scene no longer appear red. This effect continues for increasing depths, and longer wavelength (visible) colors. As a result thereof, typical underwater photographs are dominated by short wavelength colors, e.g. blue and the longer wavelength colors, e.g. red are absorbed proportionally to the depth underwater.

SUMMARY

The present invention is directed to an image capturing apparatus for providing an image of a subject in a scene within a fluid. The image capturing apparatus includes an apparatus frame, a capturing system, and a clarity sensor. The capturing system captures a captured image. The clarity sensor provides a clarity signal that corresponds to a clarity of at least a portion of the fluid. In one embodiment, the image capturing apparatus also includes a control system that utilizes the clarity signal to adjust a color composition of the captured image. With this design, in certain embodiments, the control system can adjust the color composition of the captured image to compensate for light that is attenuated by the fluid. Stated in another fashion, the control system can calculate an attenuation of light based on the clarity signal and the control system can adjust the color composition of the captured image based on the calculated attenuation and absorption of light in the fluid.

Additionally, the control system can use one or more of (i) a separation distance between the image capturing apparatus and the subject of the scene, (ii) an apparatus depth of the image capturing apparatus, (iii) a fluid type of the fluid, and (iv) a subject depth of the subject to adjust the color composition of the captured image. In this embodiment, the control system can calculate an attenuation of light based on the clarity signal and at least one of (i) the apparatus depth, (ii) the separation distance, (iii) the fluid type, and (iv) the subject depth and the control system adjusts the color composition of the captured image based on the calculated attenuation of light.

In one embodiment, the image capturing apparatus also includes a storage system. For example, the storage system can store the captured image, the related clarity signal, and possibly one or more of the related (i) apparatus depth, (ii) separation distance, (iii) fluid type, and (iv) subject depth measured at the approximate time the original image is captured. With this design, a separate control system, e.g. a computer, can be used to provide an adjusted image based on the captured image, the clarity signal, and one or more of (i) apparatus depth, (ii) separation distance, (iii) fluid type, and (iv) subject depth.

In another embodiment, the image capturing apparatus includes an illumination system that generates a first generated light beam having a first color composition and a second generated light beam having a second color composition that is different than the first color composition. In this embodiment, the illumination system generates the first generated light beam when the clarity signal corresponds to a first clarity and the illumination system generates the second generated light beam when the clarity signal corresponds to a second clarity. With this design, the control system can control the illumination system to adjust a color composition of the generated light beam based on the clarity of the fluid.

The clarity sensor can measure one or more of (i) a turbidity of a portion of the fluid, and (ii) an optical quality of a portion of the fluid, such as a transmittance through a portion of the fluid and/or a reflectance of a portion of the fluid.

In another embodiment, the apparatus includes the apparatus frame, the capturing system, and a control system that receives the original image and information regarding a clarity of the fluid and provides the adjusted image based on the image and the clarity of the fluid.

Additionally, or alternatively, the image capturing apparatus can include a selector that can be selectively controlled by a user of the image capturing apparatus. In one embodiment, the selector can be selectively controlled by a user to select one or more of (i) the clarity, (ii) the separation distance, (iii) the apparatus depth, (iv) the subject depth, or (v) the fluid type.

The present invention is also directed to a method for capturing an image of a subject that is within a fluid.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 7 is a simplified front perspective view of still another embodiment of the image capturing apparatus;

FIGS. 8A and 8B illustrate two separate scenes and two separate generated beams;

DESCRIPTION

Figure 1A:
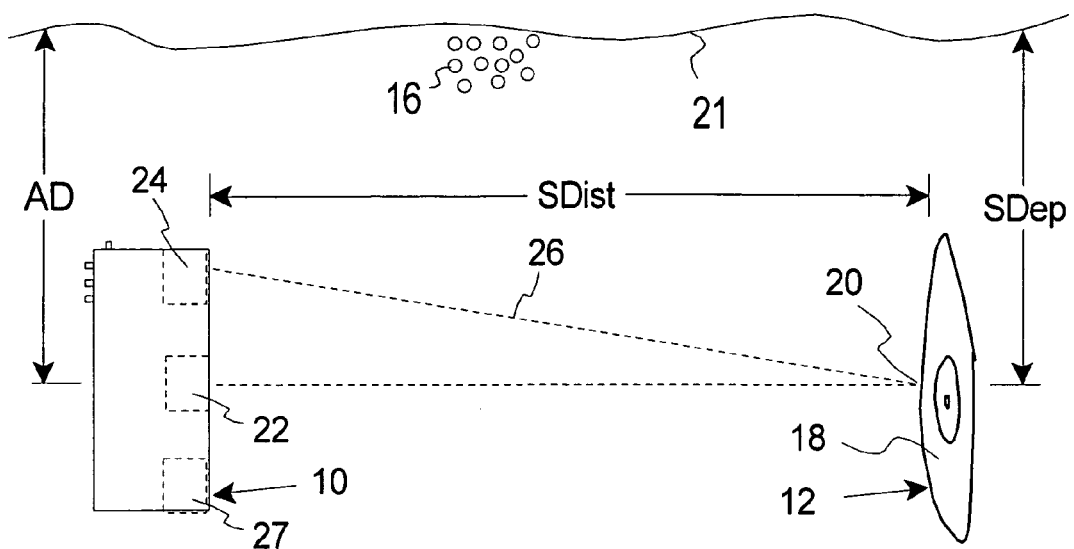
FIG. 1A is a simplified side plan illustration of a scene and an image capturing apparatus having features of the present invention.

FIG. 1A is a simplified side plan illustration of an image capturing apparatus 10 having features of the present invention and a scene 12. The image capturing apparatus 10 is useful for providing an adjusted image 214 (illustrated in FIG. 2B) of the scene 12. The type of scene 12 captured by the image capturing apparatus 10 can vary. In certain embodiments, the image capturing apparatus 10 is waterproof and is adapted to capture images of one or more scenes 12 that are partly or fully under a fluid 16 (partly illustrated as a plurality of small circles), e.g. a liquid such as water. For example, each scene 12 can include one or more underwater animals, plants, mammals, fish, coral, objects, and/or environments. In FIG. 1, the scene 12 includes a starfish 18 that is a subject 20, e.g. the focal point of the scene 12.

In certain embodiments, the image capturing apparatus 10 can be any device capable of providing the adjusted image 214, including (i) a digital camera that electronically stores the image 214, (ii) a digital camera in video mode, (iii) a conventional film type camera that records the scene 12 on a photosensitive film or plate, and/or (iv) a video recording device that electronically records still or moving images 214. As provided herein, in certain embodiments, the image capturing apparatus 10 includes one or more features that compensate for the attenuation and absorption of light in water 16 and/or that allow the image capturing apparatus 10 to more accurately capture the true colors of the underwater scene 12.

In FIG. 1A, the focal point 20 of the scene 12, e.g. the center of the starfish 18 is at a subject depth SDep below a fluid surface 21, and an optical assembly 22 (illustrated in phantom) of the image capturing apparatus 10 is at an apparatus depth AD below the fluid surface 21. For example, the subject depth SDep can be greater than, less than or approximately equal to the apparatus depth AD. The apparatus depth AD at which the image capturing apparatus 10 is still waterproof can vary according to the design of the image capturing apparatus 10. For example, in non-exclusive alternative embodiments, the image capturing apparatus 10 can be waterproof up to an apparatus depth AD of at least approximately 3, 5, 10, 30, 40, 50, or 100 meters.

Moreover, the subject 20 of the scene 12 is separated a separation distance SDist away from optical assembly 22 of the image capturing apparatus 10. The acceptable amount of separation distance SDist can be varied according to the type of optical assembly 22 utilized in the image capturing apparatus 10, the visibility of the water 16, and other factors including, but not limited to, the amount of available light. In alternative, non-exclusive embodiments, the separation distance SDist can be between approximately 0.5 and 300 meters; 1 and 100 meters; or any other range.

In one embodiment, the image capturing apparatus 10 includes an illumination system 24 (illustrated in phantom) that is controlled to generate a generated light beam 26 (illustrated with a dashed line) at approximately the same time as the image 214 is created. In one embodiment, the generated light beam 26 is directed towards the scene 12 and the image capturing apparatus 10 captures the light from the scene 12. The illumination system 24 is discussed in more detail below.

In one embodiment, the image capturing apparatus 10 includes a clarity sensor 27 (illustrated in phantom) that provides a clarity of the fluid 16 near the image capturing apparatus 10. The clarity of the fluid 16 shall mean and include any measure of the clearness of the fluid, including, but not limited to the turbidity, the visibility, and/or the optical quality of the fluid such as the reflectance or the transmittance of the fluid 16. The clarity sensor 27 is described in more detail below.

Figure 1B:
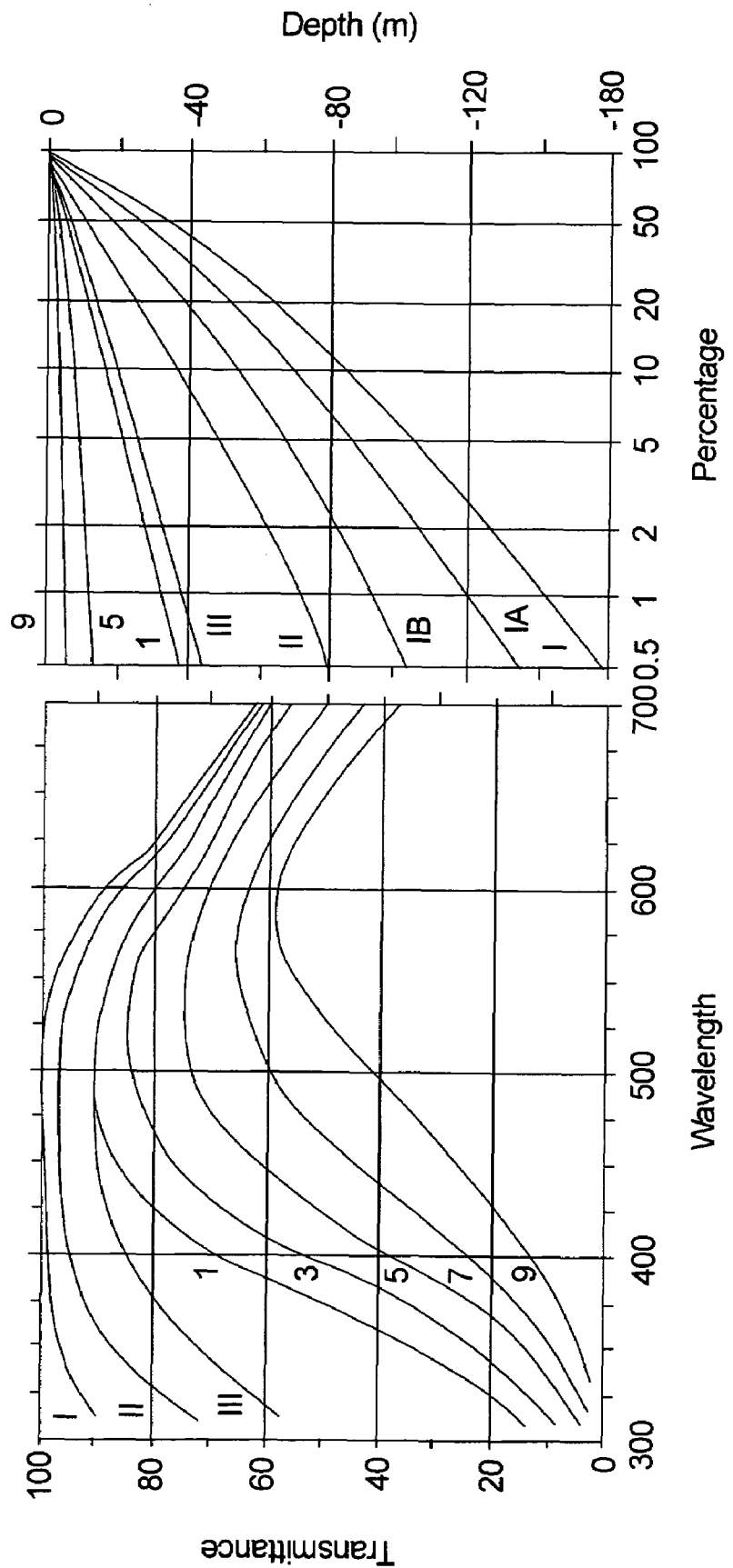
FIG. 1B includes a graph that illustrates the attenuation of light as a function of wavelength and a graph that illustrates the percentage of light reaching certain depths.

FIG. 1B includes a first graph that illustrates the attenuation of light in a fluid (the ocean) in percent per meter as a function of wavelength and a second graph that illustrates the percentage of 465 nm light reaching certain depths. In these graphs, line I represents extremely pure ocean water; line II represents turbid tropical-subtropical water; line III represents mid-latitude water; and 1-9 represent coastal waters of increasing turbidity. The incidence angle is 90 degrees for lines I-III and the incidence angle is 45 degrees for lines 1-9. The graphs in FIG. 1B are reproduced from Jerlov N.G. 1976, Marine Optics. Amsterdam: Elsevier Scientific Publishing Company ISBN 0444414908.

As can be seen in FIG. 1B, attenuation of light is influenced by type of fluid, the depth, and the turbidity. Further, the attenuation of light is also influenced by the wavelength of the light. For example, longer wavelength light is attenuated more rapidly then shorter wavelength light.

Figure 2A:
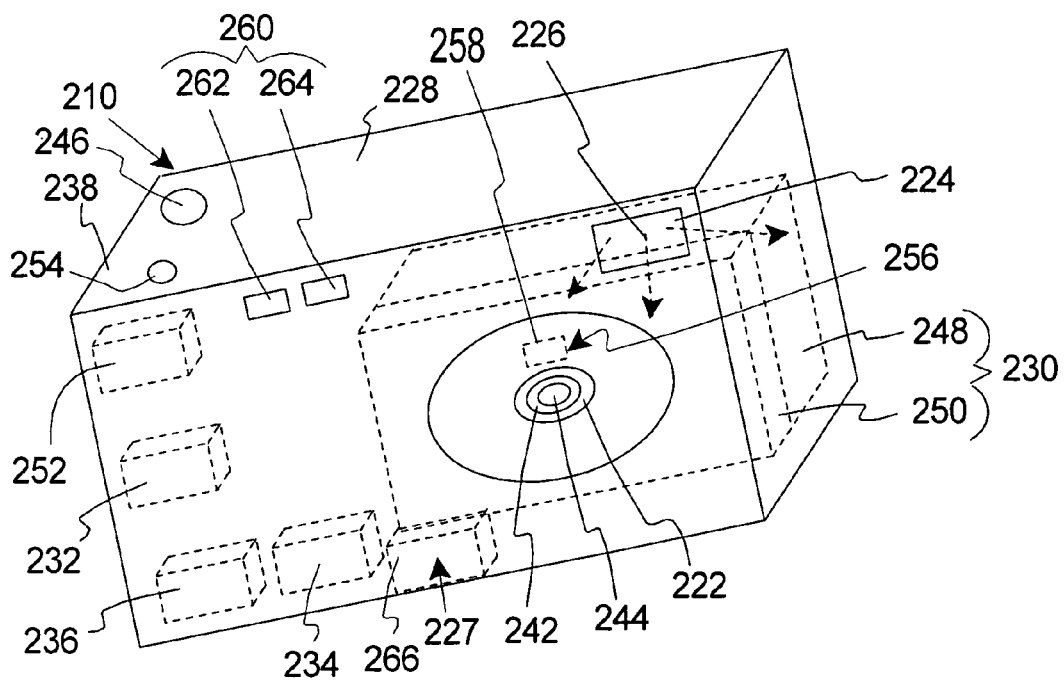
FIG. 2A is a simplified front perspective view of one embodiment of the image capturing apparatus.

FIG. 2A illustrates a simplified, front perspective view of one, non-exclusive embodiment of the image capturing apparatus 210. In this embodiment, the image capturing apparatus 210 is a camera that includes an apparatus frame 228, an optical assembly 222, a capturing system 230 (illustrated as a box in phantom), a power source 232 (illustrated as a box in phantom), an illumination system 224, an apparatus depth sensor 234 (illustrated as a box in phantom), a clarity sensor 227 (illustrated as a box in phantom), and a control system 236 (illustrated as a box in phantom). The design of these components can be varied to suit the design requirements and type of image capturing apparatus 210. Further, the image capturing apparatus 210 could be designed without one or more of these components. For example, the image capturing apparatus 210 could be designed without the apparatus depth sensor 234 and/or the illumination system 224.

The apparatus frame 228 can be rigid and support at least some of the other components of the image capturing apparatus 10. In one embodiment, the apparatus frame 228 includes a generally rectangular shaped hollow body 238 that forms a cavity that receives and retains at least a portion of the capturing system 230.

Figure 3:
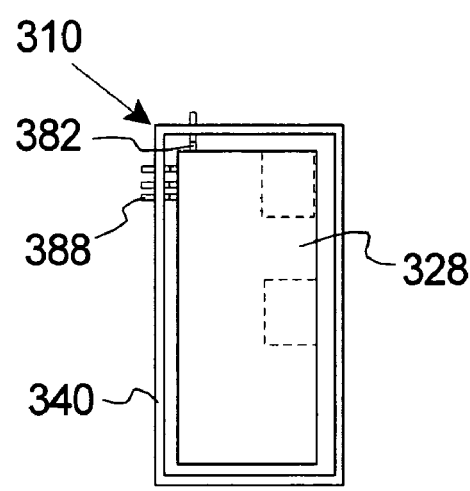
FIG. 3 is a simplified side plan illustration of another embodiment of an image capturing apparatus having features of the present invention.

In one embodiment, apparatus frame 228 is watertight and forms a watertight compartment that protects the electronic components of the image capturing apparatus 210. Alternatively, as illustrated in FIG. 3 and described below, the image capturing apparatus 310 can include an inner apparatus frame 328 and an outer apparatus frame 340 that forms an outer shell that surrounds and encloses the inner apparatus frame 328 and that provides a watertight barrier around the electronic components of the image capturing apparatus 310.

Referring back to FIG. 2A, the apparatus frame 228 can include an aperture 242 and a shutter mechanism 244 that work together to control the amount of light that reaches the capturing system 230. For example, the aperture 242 is a substantially circular opening in the front of the body 238 that helps to control the amount of light that reaches the capturing system 230. The beams of light from the object(s) of the scene 12 (illustrated in FIG. 1A) can be directed into the body 238 through the aperture 242.

The shutter mechanism 244 can include a pair of blinds (sometimes referred to as "blades") that work in conjunction with each other to allow the light to be focused on the capturing system 230 for a certain amount of time. Alternatively, for example, the shutter mechanism 244 can be all electronic and contain no moving parts. For example, an electronic capturing system 230 can have a capture time controlled electronically to emulate the functionality of the blinds. The shutter mechanism 244 can be activated by a shutter button 246. The amount of time that the shutter mechanism 244 permits the light to pass through the aperture 242 is commonly referred to as the shutter speed.

The optical assembly 222 is secured to the body 238 near the aperture 242. The optical assembly 222 can include a single lens or a combination of lenses that work in conjunction with each other to focus light onto the capturing system 230. The optical assembly 222 focuses the light that passes through the aperture 242 onto the capturing system 230.

The distance between the optical assembly 222 and the capturing system 230, commonly referred to as the focal length, can be adjusted to control how much light is ultimately focused on the capturing system 230. As the focal length decreases, the corresponding image 214 that is created at the capturing system 230 gets smaller. Conversely, as the focal length increases, the magnification of the image 214 also increases and the object(s) being captured appear to get closer.

The capturing system 230 captures a captured image (not shown in FIG. 2A), is positioned within the apparatus frame 228, and is coupled to the apparatus frame 228. The design of the capturing system 230 can vary according to the type of image capturing apparatus 10. For example, for a conventional film type camera, the capturing system 230 includes a piece of film. In this design, light focused on the film causes a chemical reaction which results in the image being formed on the film. Alternatively, as illustrated in FIG. 2A, for a digital type camera, the capturing system 230 includes an image sensor 248 (illustrated in phantom), a filter assembly 250 (illustrated in phantom), and a storage system 252 (illustrated in phantom).

The image sensor 248 receives the light that passes through the aperture 242 and converts the light into electricity. The type of image sensor 248 can vary. One non-exclusive example of an image sensor 248 for digital cameras is known as a charge coupled device ("CCD"). A CCD consists of an integrated circuit containing an array of tiny, light-sensitive photosites or pixels, which are capable of accumulating varying amounts of charge in proportion to the amount of light they receive. A CCD can contain thousands or even millions of these photosites, each of which is individually light-sensitive.

An alternative image sensor 248 that may be employed in digital cameras uses complementary metal oxide semiconductor ("CMOS") technology. CMOS devices use several transistors at each photosite to amplify and move the charge using more traditional wires.

As noted above, the image sensor 248, by itself, produces a grayscale image as it only keeps track of the total intensity of the light that strikes the surface of the image sensor 248. Accordingly, in order to produce a full color image, the filter assembly 250 is necessary to recreate the image 214 with its true colors. The filter assembly 250 is able to recreate the true colors of the image 214 by focusing on and capturing the three primary colors, red, blue and green.

The filter assembly 250 can be positioned directly in front of the image sensor 248. While there are several methods for capturing the three primary colors in a digital camera, the most common filter assembly 250 used in digital cameras is a bayer filter or bayer mask.

It should be noted that other designs for the capturing system 230 can be utilized.

It should also be noted, as discussed in more detail below, that with information from the capturing system 230, the control system 236 can compensate for the absorption of light in the fluid 16.

The storage system 252 stores the various images 214 before the images 214 are ultimately printed out, deleted, transferred or downloaded to another system (not shown), such as a computer, an auxiliary storage system or a printer. The storage system 252 can be fixedly or removable coupled to the apparatus frame 228. Non-exclusive examples of suitable storage systems 252 include flash memory, a floppy disk, a hard disk, or a writeable CD or DVD. Further, the amount of storage space within the storage system 252 can vary greatly depending upon the specific storage system 252 chosen.

Additionally, or alternatively, the storage system 252 can store information regarding the clarity, the apparatus depth AD, the separation distance SDist, the fluid type, and/or the subject depth SDep that corresponds to each captured image. With this design, in certain embodiments, the captured image can be subsequently adjusted with this information.

The power source 232 provides electrical power to the electrical components of the image capturing apparatus 210. For example, the power source 232 can include one or more chemical batteries, either the one time use disposable batteries (such as alkaline, zinc-air), or the multiple use rechargeable batteries (such as nickel-cadmium, nickel-metal-hydride, lead-acid, lithium-ion).

Often times images are captured in an environment where sufficient natural or artificial light is present so as to enable the production of a high quality and easily discernible images. However, other times images are taken in an environment which provides limited amounts of lighting where the illumination system 224 may be required. If needed, the illumination system 224 can provide the generated light beam 226 (illustrated as dashed arrows), e.g. a flash of light, that can be used to illuminate at least a portion of the scene 12.

The design of the illumination system 224 can vary according to the teachings provided herein. In one embodiment, the illumination system 224 emits a consistent, white generated light beam 226 that illuminates the scene 12. Alternatively, as described in more detail below, the illumination system 224 can generate a generated light beam 226 having a color content that compensates for the attenuation and absorption of the light by the fluid 16.

The illumination system 224 can be coupled to the apparatus frame 228. For example, the illumination system 224 can be fixedly mounted to the apparatus frame 228, positioned at least partly within the apparatus frame 228, removably affixed to the apparatus frame 228 and/or usable spaced apart from the apparatus frame 228.

If needed, the control system 236 activates the illumination system 224 at the appropriate time so that the desired image is captured. For example, the control system 236 can direct power to the illumination system 224, to produce the generated light beam 226 substantially simultaneously as the image is being captured. Alternatively, for example, the control system 236 can activate the illumination system 224 slightly before the image is being captured.

The apparatus depth sensor 234 measures the depth of a portion of the image capturing apparatus 210 under the fluid surface 21 (illustrated in FIG. 1A). For example, the depth sensor 234 can measure the depth of the image capturing apparatus 210 prior to, during and/or immediately after the image is captured with the capturing system 230. Further, the depth sensor 234 can provide an apparatus depth signal that is transferred to the control system 236 so that the control system 236 can precisely compensate for the absorption of light in the fluid 16 and/or precisely control the operation of the illumination system 224. For example, the apparatus depth sensor 234 can be a pressure sensor that measures the pressure near the image capturing apparatus 210. Alternatively, the apparatus depth sensor 234 can be another type of sensor.

Moreover, the apparatus depth signal from the apparatus depth sensor 234 can be used to display the current depth of the image capturing apparatus 10. Alternatively, or additionally, the apparatus depth signal from the apparatus depth sensor 234 via the control system 236 can be provided to a depth warning indicator 254 that notifies the user when the image capturing apparatus 10 is at a predetermined warning depth under the fluid surface 21. For example, the predetermined warning depth can be approximately at or near the maximum allowable depth that the image capturing apparatus 210 is waterproof. With this design, the depth warning indicator 254 can notify the user when the image capturing apparatus 210 is approaching or at the maximum allowable depth for the image capturing apparatus 210. Alternatively, the predetermined warning depth can be entered by the user as an indication when the user is approaching the desired maximum diving depth.

As non-exclusive examples, the depth warning indicator 254 can include an audio (e.g. a buzzer), a visual alarm (e.g. a flashing light), or a vibrator Alternatively, as described in more detail below, the approximate depth or anticipated depth in which the image 214 is captured can be manually input by the user as discussed below.

In one embodiment, the imaging capturing apparatus 210 includes an autofocus assembly 256 including one or more lens movers 258 that move one or more lenses of the optical assembly 222 in or out until the sharpest possible image of the subject 20 is received by the capturing system 230. For example, the autofocus assembly 256 can be an active or passive type system.

An fictive autofocus assembly 256 includes a distance sensor 260 that determines the distance between the optical assembly 222 and the subject 20 of the scene 12. For example, the distance sensor 260 can includes a signal generator 262 that generates a signal and a signal receiver 264. Using the distance information, the control system 236 controls the lens mover 258 to adjust the optical assembly 222.

A passive autofocus assembly 256 determines the distance between the optical assembly 222 and the subject 20 using the control system 236 to analyze the image itself. More specifically, the control system 236 looks at the scene 12 and drives the lens back and forth with the lens mover 258 searching for the best focus.

With either system, the focusing process continues while the user presses the shutter release button 246 half-way down. Further, with each system, the control system 236 can determine the distance between the optical assembly 222 and the subject 20. Thus, the autofocus assembly 256 is able to determine the separation distance SDist (illustrated in FIG. 1A) between the image capturing apparatus 210 and the subject 20. Further, the autofocus assembly, 256 is able to provide a separation distance signal to the control system 236 that relates to the separation distance SDist.

Alternately or additionally, the image capturing apparatus 210 can include a separate sensor (not shown) that determines the separation distance SDist between the image capturing apparatus 210 and the subject 20 of the scene 12. Still alternatively, as described in more detail below, the approximate separation distance SDist can be manually input in the image capturing apparatus 210 by the user.

The clarity sensor 227 measures some feature related to the clarity of the fluid 16 (illustrated in FIG. 1A) near the image capturing apparatus 210 prior to, during and/or after the image is captured with the capturing system 230. In one embodiment, the clarity sensor 227 can provide a clarity signal that relates to the clarity, that is transferred to the control system 236 so that the control system 236 can precisely compensate for the absorption of light in the fluid 16 and/or precisely control the operation of the illumination system 224. In another embodiment, the clarity signal is transferred to the storage system 252 along with the image for subsequent processing as detailed below.

The design of the clarity sensor 227 can vary. For example, the clarity sensor 227 can be a turbidity sensor 266 that measures the turbidity of the fluid 16. In one embodiment, the clarity sensor 227 transmits analog, continuous turbidity data to the control system 236.

In another embodiment, the clarity sensor 227 can be an optical quality sensor that measures an optical quality of the fluid 16. For example, the optical quality sensor can be a transmittance sensor that measures relative light transmittance over a fixed distance in the fluid 16. As another example, the optical quality sensor can be a reflectance sensor that measures the reflectance of light by the fluid 16. Still, alternatively, the clarity sensor 227 can be another type of sensor.

In one embodiment, the clarity sensor 227 could transmit a limited number of discrete states of clarity in order to simplify processing by the control system 236. In alternative, non-exclusive embodiments, the clarity sensor 227 could transmit 4, 8, 16, 32, or 64 different levels of turbidity, transmittance, or reflectance.

In one embodiment, the clarity sensor 227 is secured to the apparatus frame 228.

The control system 236 is electrically connected to and controls the operation of the electrical components of the image capturing apparatus 210. For example, the control system 236 is electrically connected to autofocus assembly 256, the apparatus depth sensor 234, the clarity sensor 227, and the illumination system 224 and controls the operation of the autofocus assembly 256, the apparatus depth sensor 234, and the illumination system 224 to precisely control these components. The control system 236 can include one or more processors and circuits and the control system 236 can be programmed to perform one or more of the functions described herein.

In certain embodiments, the control system 236 adjusts a color content of the captured image based one or more of the following factors (i) the clarity of the fluid 16, (ii) the separation distance SDist, (iii) the apparatus depth AD, (iv) the subject depth SDep, and (v) a fluid type of the fluid 16. For example, the control system 236 can adjust the color content of the captured image 214 based on any one or any combination of the factors described herein. In one embodiment, the control system 236 utilizes the clarity signal by itself to adjust the color content of the captured image. In other embodiments, for example, control system 236 uses the clarity signal and one or more of the other factors (ii)-(v) detailed above to create a more complex color adjustment profile.

It should be noted that one or more of the factors can be manually input by the user into the control system 236 and/or measured by the image capturing apparatus 210.

Alternatively, the control system 236 can cause the captured image, and one or more of the related clarity of the fluid 16, the separation distance SDist, the apparatus depth AD, the subject depth SDep, and/or the fluid type to be stored in the storage system 252 for subsequent processing with a separate computer as described in more detail below.

In one embodiment, control system 236 evaluates the color content that is present in an originally captured initial image that is captured by the capturing system 230 from the scene 12. The control system 236 can subsequently replace and/or enhance the colors that were attenuated and generate the adjusted image 214 which more accurately represents the actual color composition of the scene 12.

For example, if the control system 236 determines that the subject 20 contains a red region, the control system 236 can calculate an approximate attenuation of the red light on the subject 20 based on one or more of (i) the clarity, (ii) the separation distance SDist, (iii) the apparatus depth AD, (iv) the subject depth SDep, or (v) the fluid type. The amount of attenuation and/or absorption of light can be calculated with the control system 236 using information from graphs that are somewhat similar to the graphs illustrated in FIG. 1B or other sources. With information regarding the attenuation, the control system 236 can provide reverse attenuation of the red, e.g add red to the initial image so that the displayed image 214 more accurately represents the actual colors of the scene 12.

The control system 236 can perform a similar function for each of the other colors in the subject 20 and the rest of the scene 12. Thus, the control system 236 adjusts the captured image by adjusting the intensity of the red, green and blue color values in the adjusted image 214. Blue is significantly attenuated, green has medium attenuation and red has high amplification. As a result thereof, in one embodiment, the control system 236 can adjust the color compensation of the captured image by adding more red than green or blue. With this design, the control system 236 can provide reverse compensation and replace the colors of the scene 12 that are lost due to attenuation.

In one embodiment, the control system 236 utilizes information regarding the clarity, the separation distance SDist (from the autofocus assembly 256, the separate sensor, or manual input) and the apparatus depth AD (from the depth sensor 234, or manual input) to estimate and calculate the attenuation of the light (red, green, and blue colors). Further, the control system 236 evaluates the colors of the originally captured image and compensates for the absorption of light (lost colors) in the fluid 16 so that the displayed image 214 more accurately represents the true colors of the scene 12 within the fluid 16. Thus, the control system 236 can compensate for the longer red, orange, yellow, and green wavelengths of light that are absorbed. Stated in another fashion, the control system 236 can then provide reverse attenuation of these colors, and re-compensate the digital picture to restore the actual colors more accurately.

In one embodiment, the control system 236 is coupled to the apparatus frame 228 and is positioned within the apparatus frame 228.

Figure 2B:
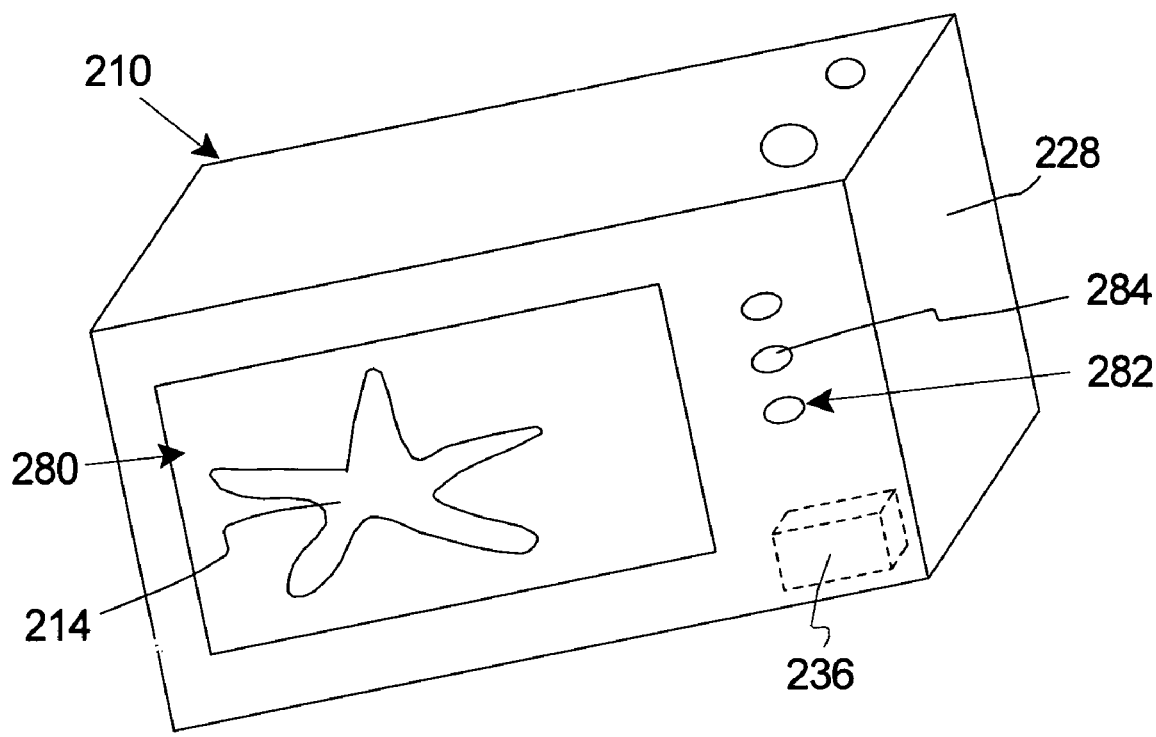
FIG. 2B is a simplified rear perspective view of the image capturing apparatus of FIG. 2A.

Referring to FIG. 2B, additionally, the image capturing apparatus 210 can include an image display 280 that displays the image 214 that is being captured and optionally adjusted by the control system 236. With this design, the user can decide which images 214 should be stored in the storage system 252 and which images 214 should be deleted. Further, as a result thereof, divers and snorkelers can share the adjusted images 214 upon completion of the diving or snorkeling experience.

In one embodiment, the image display 280 can be fixedly mounted to the apparatus frame 228 on the back side. Alternatively, the image display 280 ran be secured to the apparatus frame 228 with a hinge mounting system (not shown) that enables the display to be pivoted away from the apparatus frame 228. One non-exclusive example of an image display includes an LCD screen.

Moreover, the image capturing apparatus 210 can include one or more control switches 282 electrically connected to the control system 236 that allows the user to control the functions of the image capturing apparatus 210. For example, the control switches 282 can be used to turn on and off the apparatus 210, delete images 214, focus the image 214, and many other functions.

Additionally, one or more of the control switches 262 can be a selector 284 that can be used to manually input one or more of (ii) the clarity, (ii) the separation distance, (iii) the apparatus depth, (iv) the subject depth, and/or (v) the fluid type.

Moreover, one or more of the control switches 262 can be used to selectively switch the image capturing apparatus 210 to an under liquid mode in which one or more of the image compensation features disclosed herein are activated.

In one embodiment, information regarding the clarity of the fluid 16 can also be displayed and updated on the image display 280.

FIG. 3 is a simplified side plan illustration of another embodiment of an image capturing apparatus 310 that includes an inner apparatus frame 328 and a selectively removable outer apparatus frame 340. In this embodiment, the inner apparatus frame 328 is somewhat similar to the corresponding apparatus frame 228 described above. However, in this embodiment, the inner apparatus frame 328 is not waterproof. Instead, in this embodiment, the outer apparatus frame 340 forms an outer shell that surrounds and encloses the inner apparatus frame 328 and provides a watertight barrier around the electronic components of the image capturing apparatus 310.

In one embodiment, the outer apparatus frame 340 is at least partly made of a clear material. Moreover, the outer apparatus frame 340 can include one or more pass through switches 388 that can be used to control the operation of the control switches 382 of the image capturing apparatus 310. For example, each pass through switch 388 can be a button that is aligned with and engages one of the control switches 382. Further, each button extends through the outer apparatus frame 340 and is movably sealed to the outer apparatus frame 340. With this design, the user can control the control switches 382 when the outer apparatus frame 340 encircles the rest of the image capturing apparatus 310.

It should be noted that one or more of the sensors or electrical components of the image capturing apparatus 310 can be secured to the outer apparatus frame 340 instead of the inner apparatus frame 328. For example, the apparatus depth sensor 234 (illustrated in FIG. 2A) or the clarity sensor 227 (illustrated in FIG. 2A) can be secured to the outer apparatus frame 340 and connected with contacts to the control system 236 (illustrated in FIG. 2A). Still alternatively, the outer apparatus frame 340 can include one or more passageways that allow the fluid to contact one or more of the apparatus depth sensor 234 (illustrated in FIG. 2A) or the clarity sensor 227 (illustrated in FIG. 2A) if these sensors are secured to the inner apparatus frame 328.

Figure 4A:
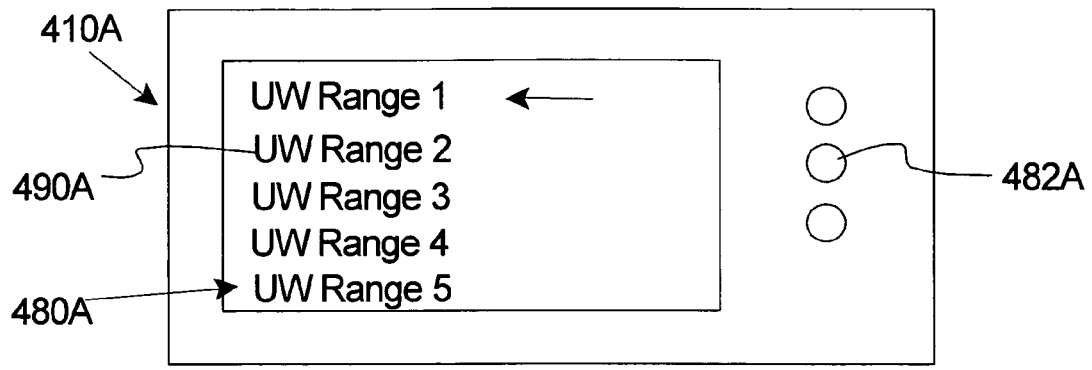
FIGS. 4A-4E are rear views of alternative embodiments of the image capturing apparatus.

FIG. 4A is a simplified rear plan illustration of another embodiment of an image capturing apparatus 410A that is similar to the corresponding apparatus described above. However, in this embodiment, the image capturing apparatus 410A does not include a depth sensor. In this embodiment, the user can manually input the approximate apparatus depth AD that the image capturing apparatus 410A will be utilized or the approximate apparatus depth AD at which the image capturing apparatus 410A is now at. Alternatively, even if the image capturing apparatus 410A does include a depth sensor, the user could opt to operate the image capturing apparatus 410A in a manual mode in which the apparatus depth AD is manually input into the image capturing apparatus 410A.

In one embodiment, in the manual mode, the image display 480A could display a limited number of different apparatus depth ranges that are commonly experienced during snorkeling and/or scuba diving. For example, in FIG. 4A, the image display 480A list four different apparatus depth ranges 490A, namely (i) underwater range 1—used for snorkeling (average compensation 20 feet); (ii) underwater range 2—shallow SCUBA (average compensation 50 Feet); (iii) underwater range 3—medium depth SCUBA (average compensation 70 Feet); and (iv) underwater range 4—Deep depth SCUBA (average compensation 100 Feet). It should be noted that greater than four or less than four underwater ranges could be utilized and/or that one or more of the underwater ranges could have different depths.

With this design, the user can use one or more of the control switches 482A to move a cursor to select one of the potential underwater depth ranges 490A that they will likely experience during the snorkel or dive. The selection can be made prior or during the snorkel or dive.

After the manual selection of the underwater range 490A, the control system 236 (illustrated in FIG. 2A) can adjust the color content of the captured image to compensate for the attenuated colors as described above.

Figure 4B:
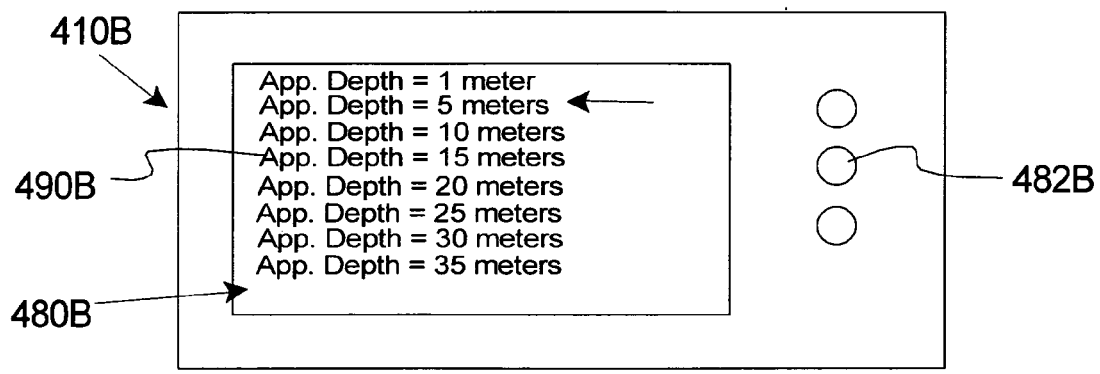

FIG. 4B is a simplified rear plan illustration of another embodiment of an image capturing apparatus 410B that is similar to the corresponding apparatus described above in FIG. 4A. In this embodiment, the user can again manually input the approximate apparatus depth AD that the image capturing apparatus 410B will be utilized or the approximate apparatus depth AD at which the image capturing apparatus 410B is now at. Alternatively, even if the image capturing apparatus 410B does include the depth sensor, the user could opt to operate the image capturing apparatus 410B in a manual mode in which the apparatus depth AD is manually input into the image capturing apparatus 410B.

In one embodiment, in the manual mode, the image display 480B could display a limited number of different apparatus depths AD. For example, in FIG. 4B, the image display 480B displays eight different apparatus depths AD 490B, namely 1, 5, 10, 15, 20, 25, 30, and 35 meters. It should be noted that greater than eight or less than eight apparatus depths AD could be utilized and/or that other apparatus depths AD could be utilized.

With this design, the user can use one or more of the control switches 482B to move a cursor to select one of the apparatus depths AD prior to or during the snorkel or dive.

After the manual selection of the apparatus depth AD 490B, the control system 236 (illustrated in FIG. 2A) can adjust the color content of the captured image to compensate for the attenuated colors as described above.

Figure 4C:
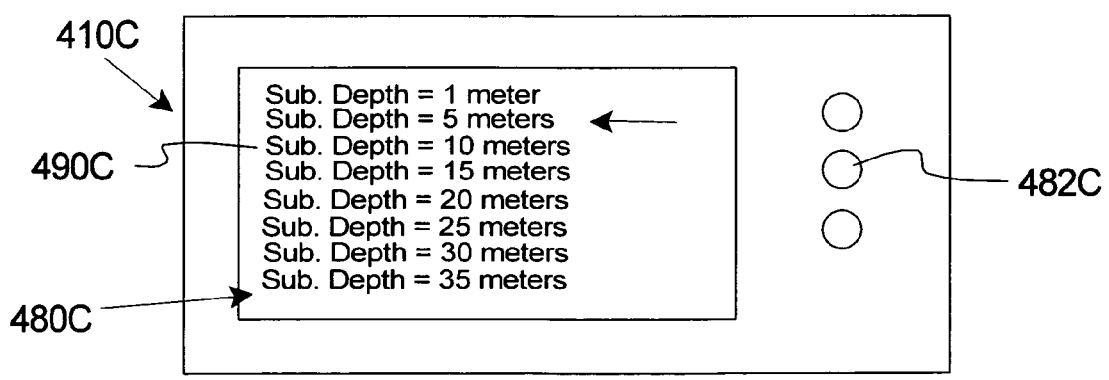

FIG. 4C is a simplified rear plan illustration of another embodiment of an image capturing apparatus 410C that is similar to the corresponding apparatus described above in FIG. 4A. In this embodiment, the user can manually input an approximate subject depth SDep of the subject 20 (illustrated in FIG. 1A) into the image capturing apparatus 410C.

In one embodiment, in the manual mode, the image display 480C could display a limited number of different subject depths SDep. For example, in FIG. 4C, the image display 480C displays eight different subject depths SDep 490C, namely 1, 5, 10, 15, 20, 25, 30, and 35 meters. It should be noted that greater than eight or less than eight subject depths SDep could be utilized and/or that other subject depths SDep could be utilized.

With this design, the user can use one or more of the control switches 482C to move a cursor to select one of the subject depths SDep prior to or during the snorkel or dive.

After the manual selection of the subject depth SDep 490C, the control system 236 (illustrated in FIG. 2A) can adjust the color content of the captured image to compensate for the attenuated colors as described above.

Figure 4D:
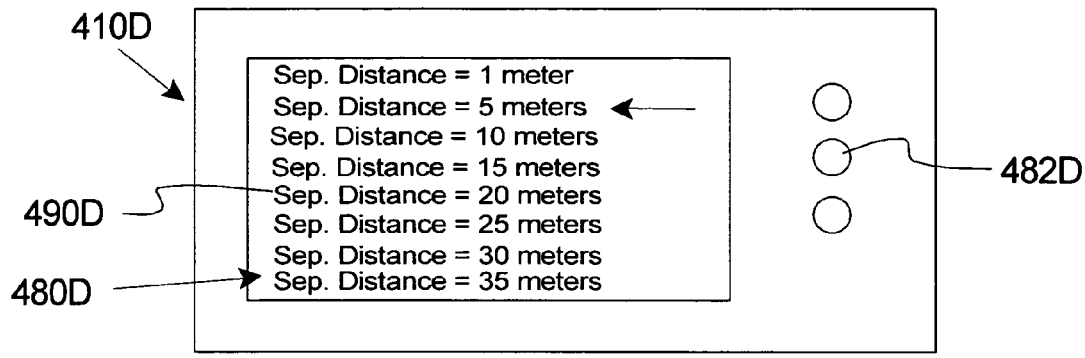

FIG. 4D is a simplified rear plan illustration of another embodiment of an image capturing apparatus 410D that is similar to the corresponding apparatus described above in FIG. 2A. In this embodiment, the user can manually input the approximate separation distance SDist that the image capturing apparatus 410D is positioned away from the subject 20 (illustrated in FIG. 1A) of the scene 12 (illustrated in FIG. 1A. Alternatively, even if the image capturing apparatus 410D does include a sensor that estimates the separation distance SDist, the user could opt to operate the image capturing apparatus 410 in an underwater manual mode in which the separation depth SDist is manually input into the image capturing apparatus 410D by the user.

In one embodiment, in the manual mode, the image display 480D could display a limited number of different separation distances SDist 490D. For example, in FIG. 4D, the image display 480D lists eight different separation distances SDist 490D, namely 1, 5, 10, 15, 20, 25, 30, and 35 meters. It should be noted that greater than eight or less than eight separation distances SDist could be utilized and/or that other separation distances SDist could be utilized.

With this design, the user can use one or more of the control switches 482D to move a cursor to select one of the separation distances SDist prior to or during the snorkel or dive.

After the manual selection of the separation distance SDist, the control system 236 (illustrated in FIG. 2A) can adjust the color content of the captured image to compensate for the attenuated light.

Figure 4E:
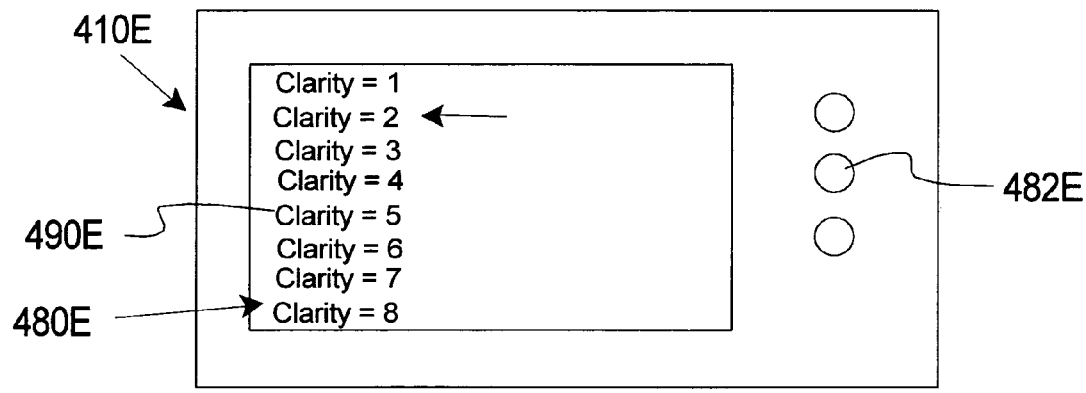

FIG. 4E is a simplified rear plan illustration of still another embodiment of an image capturing apparatus 410E that is similar to the corresponding apparatus described above. However, in this embodiment, the image capturing apparatus 410E does not include a clarity sensor. In this embodiment, the user can manually input the approximate clarity that the image capturing apparatus 410E will be utilized or the approximate clarity of the fluid at which the image capturing apparatus 410E is now at. Alternatively, even if the image capturing apparatus 410E does include a clarity sensor, the user could opt to operate the image capturing apparatus 410E in a manual mode in which the clarity is manually input into the image capturing apparatus 410E.

In one embodiment, in the manual mode, the image display 480E could display a limited number of different clarity levels 490E that are commonly experienced during snorkeling and/or scuba diving. For example, in FIG. 4E, the image display 480A lists eight different clarity levels, namely clarifies 1 through 8. In this embodiment, clarity level 1 could represent extremely clear fluid and clarity levels 2-8 represent sequentially reduced clarity levels. It should be noted that greater than eight or less than eight clarity levels could be utilized.

In one embodiment, each clarity level could correspond to a range of visibility in the fluid. For example, clarity level 1 could represent visibility of 80-100 feet, clarity level 2 could represent visibility of 70-80 feet, clarity level 3 could represent visibility of 60-70 feet, clarity level 4 could represent visibility of 50-60 feet, clarity level 5 could represent visibility of 40-50 feet, clarity level 6 could represent visibility of 30-40 feet, clarity level 7 could represent visibility of 20-30 feet, and clarity level 8 could represent visibility of 0-20 feet.

Alternatively, the clarity levels could represent different levels of turbidity, different levels of transmittance or different levels of reflectance.

With this design, the user can use one or more of the control switches 482E to move a cursor to select one of the clarity levels 490E that they will likely experience during the snorkel or dive. The selection can be made prior or during the snorkel or dive.

After the manual selection of the clarity level 490E, the control system 236 (illustrated in FIG. 2A) can adjust the color content of the captured image to compensate for the attenuated colors as described above.

Figure 5A:
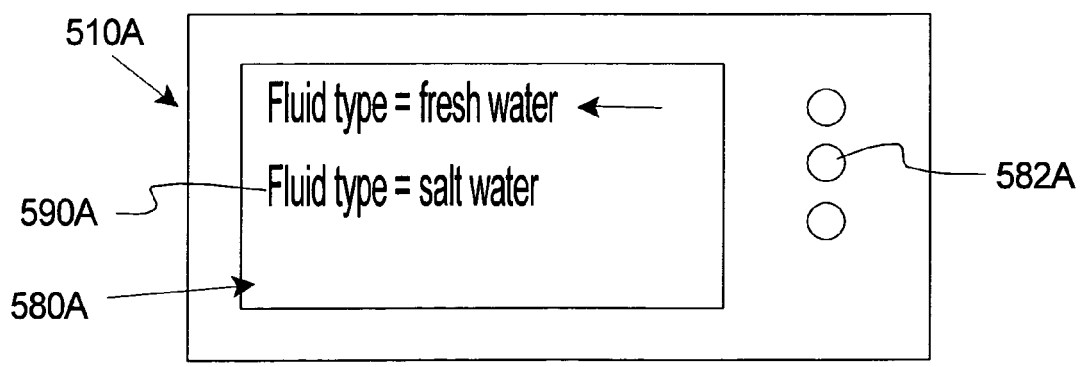
FIGS. 5A and 5B are rear views of more alternative embodiments of the image capturing apparatus.

FIG. 5A is a simplified rear plan illustration of another embodiment of an image capturing apparatus 510A that is similar to the corresponding apparatus described above in FIG. 2A. In this embodiment, the user can manually input a fluid type that the image capturing apparatus 510A will be utilized within. In one embodiment, in the manual mode, the image display 580A could display a limited number of different fluid types 590A. For example, in FIG. 5A, the image display 580A displays the choice of fresh water and salt water. With this design, the user can use one or more of the control switches 582A to move a cursor to select one of the fluid types 590A. Alternatively, other fluid type choices could be available. For example, the fluid types described in FIG. 1B could be listed as choices.

After the manual selection of the fluid type 590A, the control system 236 (illustrated in FIG. 2A) can adjust the color content of the captured image to compensate for the lost colors. The control system 236 can use the type of fluid, in addition to or alternatively to the clarity, the apparatus depth AD and/or the separation distance SDist to further compensate for the attenuated light.

Figure 5B:
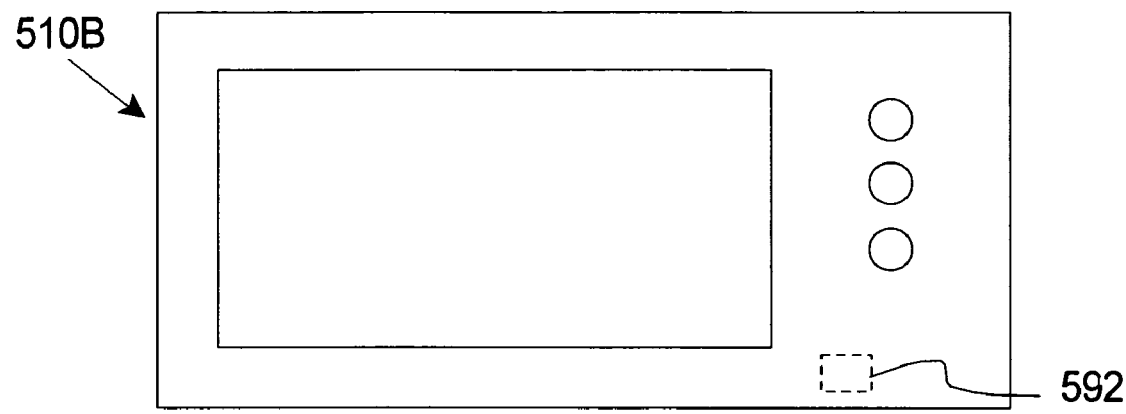

FIG. 5B is a simplified rear plan illustration of another embodiment of an image capturing apparatus 510B that is somewhat similar to the corresponding apparatus described above in FIG. 5A. However, in this embodiment, the image capturing apparatus 510B includes a fluid type sensor 592 (illustrated in phantom) that determines the type of fluid in which the image capturing apparatus 510B is subjected to. For example, the fluid type sensor 592 can be a conductivity sensor that evaluates if the capturing apparatus 510B is positioned in fresh water or salt water.

After the information from the fluid type sensor 592 is transferred to the control system 236 (illustrated in FIG. 2A), the control system 236 can adjust the color content of the captured image to compensate for the attenuated light.

Figure 6:
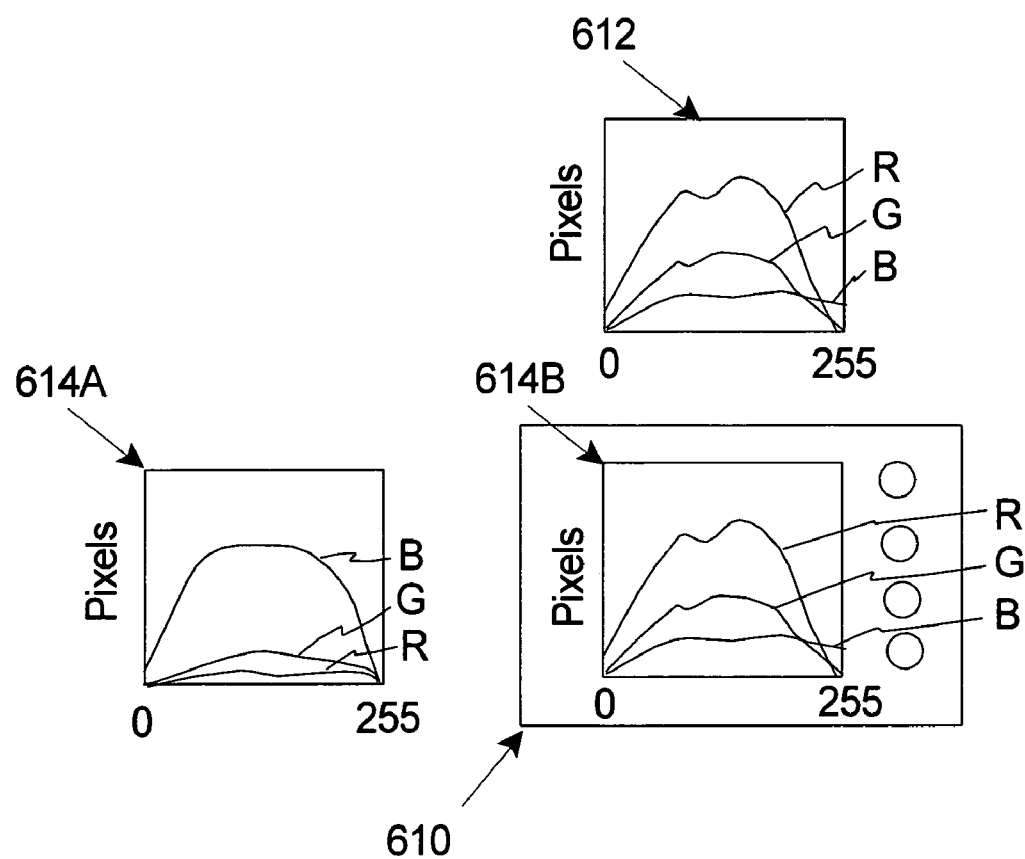
FIG. 6 is a simplified illustration of a RGB histogram of a scene, a RGB histogram of an unadjusted captured image of the scene, and a RGB histogram of an adjusted captured image of the scene.

FIG. 6 is a simplified illustration of a RGB histogram 612 of a scene within a fluid (not shown), a simplified view of a RGB histogram 614A of an unadjusted, originally captured image of the scene, and a simplified view of an image capturing apparatus 610 that displays a RGB histogram 614B of an adjusted captured image of the scene. In the RGB histograms 612, 614A, 614B, line designated "R" represents red, line designated "G" represents green, line designated "B" represents blue, and the level of R, G, and B is expressed as a number between 0 and 255. The vertical axis is relative number of pixels that have each value of R, G, B. For example, the higher the position of the curve, the higher number of pixels that have that particular value of R, G, B.

FIG. 6 illustrates that the RGB histogram 614A of the unadjusted captured image that is originally captured by the image capturing apparatus 610 without any color compensation by the image capturing apparatus 610 is very different from the RGB histogram 612 of the original scene. More specifically, some of the red R and green G from the scene has been lost. This difference is caused by the attenuation of light in the fluid. As a result thereof, the originally captured image does not accurately represent the true colors of the scene.

The RGB histogram 614B of the adjusted captured image is the color profile of the adjusted capture image that is adjusted by the image capturing apparatus 610 with the color compensation as described above. As is illustrated in FIG. 6, the image capturing apparatus 610 has compensated for the attenuation of light. As a result thereof, the RGB histogram 614B of the adjusted captured image closely resembles the RGB histogram 612 of the scene and the RGB histogram 614B of the adjusted captured image more accurately captures the true colors of the scene.

FIG. 7 illustrates a simplified, front perspective view of yet another embodiment of an image capturing apparatus 710 that is somewhat similar to the corresponding image capturing apparatus 210 described above and illustrated in FIG. 2A. However, in this embodiment, the illumination system 724 can be controlled to precisely adjust the color content of the generated light beam 726 to compensate for the absorption of the light by the fluid 16 (illustrated in FIG. 1A) and/or replace the colors that were lost by absorption. For example, the illumination system 724 can precisely adjust the color content of the generated light beam 726 according to one or more of the clarity of the fluid, apparatus depth AD (illustrated in FIG. 1A), the separation distance SDist (illustrated in FIG. 1A), the subject depth Sdep (illustrated in FIG. 1A), and/or the type of fluid 16.

In one embodiment, the generated light beam 726 includes at least one of the primary colors, namely red, blue and green. For example, in alternative embodiments, the illumination system 724 can generate a generated light beam 726 that includes two or all three of the primary colors.

In one embodiment, the illumination system 724 includes a red light emitting diode ("LED") 794A, a blue LED 794B, and a green LED 794C that can be selectively and individually controlled and tuned to produce a generated light beam 726 that is red, blue, green, or potentially millions of other colors using different intensities for the LEDs 794A-794C. The LEDs 794A-794C can be placed side by side or the LEDs 794A-794C can be integrated together. Alternatively, the illumination system 724 can be another type of device that includes a red light source, a blue light source and a green light source and/or is capable of generating a light beam 726 that include red, blue and green colors.

In alternative, non-exclusive embodiments, the illumination system 724 can be controlled to selectively and alternatively produce 2, 5, 10, 20, 50, 100, 500, 1000, or 1,000,000 different generated light beams 726 with each generated light beam 726 having a different color composition.

In this embodiment, the control system 736 controls the operation of the illumination system 724 to precisely control the timing and color content of the generated light beam 726. As an example, the control system 736 can directed power to the LEDs 794A-794C at different levels so that the LEDs 794A-794C illuminate at the desired intensities and the desired color content of the generated light beam 726 is generated.

In one embodiment, the control system 736 controls the operation of the illumination system 724 so that the generated light beam 726 has the appropriate color composition to compensate for the light that was attenuated from the scene 12 (illustrated in FIG. 1A). For example, the control system 736 can evaluate the pre-captured image (not shown) just prior to capturing the actual image, the clarity, the apparatus depth AD, the separation distance SDist, the subject depth Sdep, and/or the type of fluid 16. With this information, the control system 736 can calculate the color composition of the generated light beam 726 necessary to compensate for the attenuated light and the control system 736 can control the illumination system 724 so that the appropriate generated light beam 726 is created.

It should be noted that the generated light beam 726 travels to the subject 20 (illustrated in FIG. 1A) and back to the image capturing apparatus 710. Stated in another fashion, the generated light beam 726 travels approximately two times the separation distance SDist. Thus, the control system 736 can also factor in the attenuation of the generated light beam 726 in the determination of the color composition of the generated light beam 726.

FIGS. 8A and 8B illustrate two separate, non-exclusive scene clarifies 896A, 896R for two different scenes 812A, 812B and that the image capturing apparatus 810A, 810B generates a different generated light beam 826A, 826B for each scene clarity 896A, 896B. More specifically, referring to FIG. 8A, the scene 812A has a first scene clarity 896A and the image capturing apparatus 810A generates a first generated light beam 826A having a first color composition 898A. Further, referring to FIG. 8B, the scene 812B has a second scene clarity 896B and the image capturing apparatus 810B generates a second generated light beam 826B having a second color composition 898B.

In this example, the control system 736 (illustrated in FIG. 7) causes the illumination system 724 (illustrated in FIG. 7) to generate the first generated light beam 826A when it is determined that the first scene clarity 868A exists and to generate the second generated light beam 826B when it is determined that the second scene clarity 868B exists. Stated in another fashion, in FIGS. 8A, 8B, the illumination system 724 generates the first generated light beam 826A when the clarity signal has a first clarity 896A and the illumination system 724 generates the second generated light beam 826B when the clarity signal has a second clarity 896B that is different than the first clarity 896A.

The control system 724 can evaluate the apparatus depth AD, separation distance SDist, subject depth SDep and/or fluid type to determine the scene clarity 868A, 868B.

In addition to the clarity, the control system 724 can also evaluate one or more of the apparatus depth AD, separation distance SDist, subject depth SDep and/or fluid type to determine the color composition of the light beam.

In this example, the first color composition 898A is different than the second color composition 898B. For example, (i) the first color composition 898A of the first generated light beam 826A that includes more red R than green G or blue B, and has color composition that is approximately 200R(red)+100G(green)+80B(blue), and (ii) the second color composition 898B of the second generated light beam 826B has approximately equal amounts a blue B, red R and green G and has a color composition that is approximately 100R(red)+100G(green)+100B(blue). It should be noted that the numbers for red, green and blue above are the tonal values on a scale of 0 to 255. Further, for example, a color composition 255R(red)+255G(green)+255B(blue) is pure white a color composition of 0R(red)+0G(green)+0B(blue) is pure black, and a color composition of 127R(red)+127G(green)+127B(blue) is middle grey.

Figure 9A:
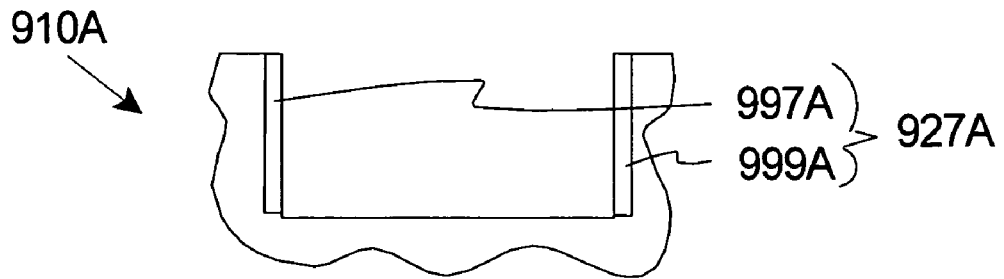
FIGS. 9A and 9B illustrate alternative clarity sensors having features of the present invention.

FIG. 9A is a simplified view of one embodiment of the clarity sensor 927A that can be part of the image capturing apparatus 910A. In this embodiment, the clarity sensor 927A is an optical quality sensor, e.g. a transmittance sensor that measures the ratio of the radiant energy transmitted to the total radiant energy incident on the fluid 16. In one embodiment, the transmittance sensor includes a light source 997A and a detector 999A that is spaced apart from the light source 997A and separated by the fluid 16. The light source 997A generates a beam of light at the fluid and the detector 999A measures the amount of light received. In this embodiment, the sensor 927 can be a simple analog opto-coupler type device.

Figure 9B:
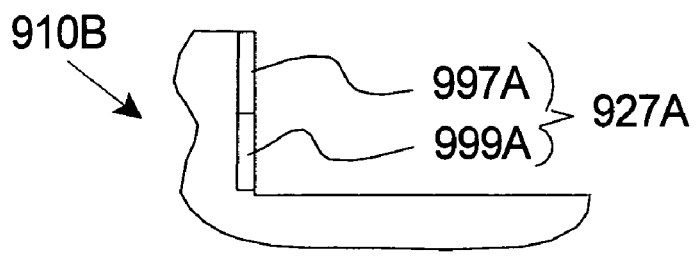

FIG. 9B is a simplified view of another embodiment of the clarity sensor 927B that can be part of the image capturing apparatus 910B. In this embodiment, the clarity sensor 927B is an optical quality sensor, e.g. a reflectance sensor that measures the ratio of the total amount of light reflected by the fluid 16 to the total amount of radiation incident on the fluid 16. In FIG. 9B, the reflectance sensor includes a light source 997B and a detector 999B. The light source 997B generates a beam of light at the fluid and the detector 999B measures the amount of light reflected off of the fluid 16.

Figure 10:
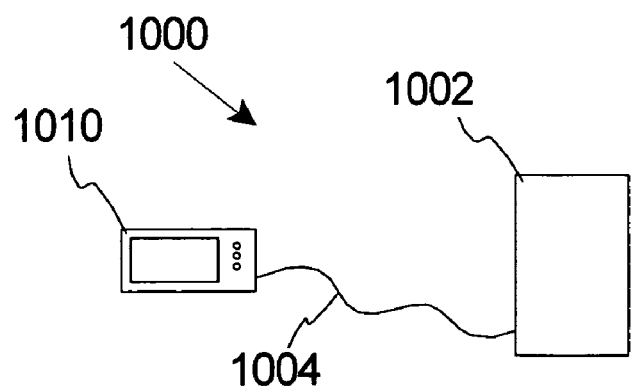
FIG. 10 is a side illustration of an apparatus having features of the present invention.

FIG. 10 illustrates another embodiment of an apparatus 1000 having features of the present invention. In this embodiment, the apparatus 1000 includes an image capturing apparatus 1010, an additional control system 1002, and a connection line 1004 that electrically connects the image capturing apparatus 1010 to the additional control system 1002. In this embodiment, the image capturing apparatus 1010 captures image (not shown in FIG. 10) and the additional control system 1002 can be used to adjust the color composition of the image.

For example, for each image, the image capturing apparatus 1010 can store the originally captured image, the related clarity signal and possibly one or more of the related (i) apparatus depth, (ii) separation distance, (iii) fluid type, and (iv) subject depth at the approximate time the original image is captured.

The separate control system 1002 can be a computer or other type of processing device. With this design, the separate control system 1002 can be used to provide an adjusted image based on the original image, the clarity signal, the apparatus depth, the separation distance, the fluid type, and the subject depth.

In one embodiment, the separate control system 1002 can evaluate the color content that is present in an originally captured initial image that is captured by the capturing system (not shown in FIG. 10). The control system 1002 can subsequently replace and/or enhance the colors that were attenuated and generate the adjusted image (not shown in FIG. 10) which more accurately represents the actual color composition of the scene.

For example, if the separate control system 1002 determines that the subject contains a red region, the separate control system 1002 can calculate an approximate attenuation of the red light on the subject based on one or more of (i) the clarity, (ii) the separation distance SDist, (iii) the apparatus depth AD, (iv) the subject depth SDep, or (v) the fluid type. The amount of attenuation and/or absorption of light can be calculated with the separate control system 1002 using information from graphs that are somewhat similar to the graphs illustrated in FIG. 1B or other sources. With information regarding the attenuation, the separate control system 1002 can provide reverse attenuation of the red, e.g add red to the initial image so that the displayed image more accurately represents the actual colors of the scene. The separate control system 1002 can perform a similar function for each of the other colors in the subject and the rest of the scene. Thus, the separate control system 1002 adjusts the captured image by adjusting the intensity of the red, green and blue color values in the adjusted image.

Figure 11A:
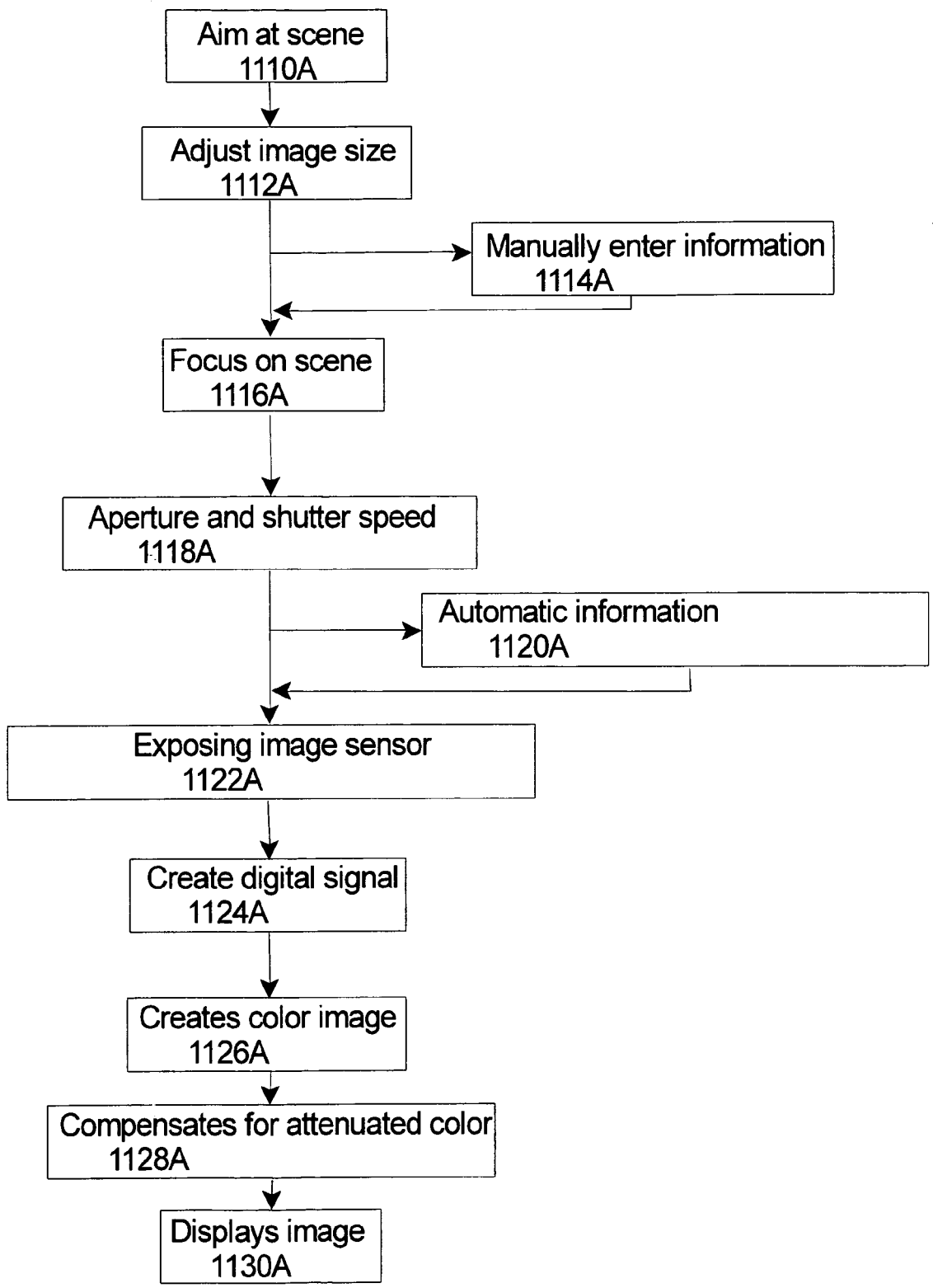
FIG. 11A is a simplified flowchart that illustrates one example of the operation of the image capturing apparatus.

FIG. 11A is a simplified flowchart that illustrates one non-exclusive example of the operation of the image capturing apparatus. It should be noted that one or more of the steps can be omitted or the order of steps can be switched. First, the image capturing apparatus is aimed toward the scene 1110A. Second, the user adjusts the zoom so as to adjust the size of the image as desired 1112A. Next, the user can manually enter information regarding the clarity, apparatus depth AD, separation distance SDist, subject depth SDep, and/or fluid type into the apparatus 1114A. Next, the user presses lightly on the shutter button to enable the image capturing apparatus to automatically focus on the object(s) 1116A. Subsequently, the image capturing apparatus sets the aperture and shutter speed 1118A. Simultaneously, the control system can receive information from one or more sensors relating to clarity, apparatus depth AD, separation distance SDist, and/or fluid type 1120A. Subsequently, the user presses the shutter button all the way, which resets the image sensor, and opens the first shutter shade thereby exposing the image sensor to light, building up an electrical charge until the second shutter shade closes thereby preventing further light from reaching the image sensor 1122A. Next, the ADC measures the charge at each photosite of the image sensor and creates a digital signal that represents the values of the charge at each photosite 1124A. Subsequently, the control system interpolates the data from the different photosites, with assistance from the filtering component, to create the color image 1126A. Next, the control system compensates for the attenuated light 1128A. Finally, the image is displayed on the image display 1130A.

Figure 11B:
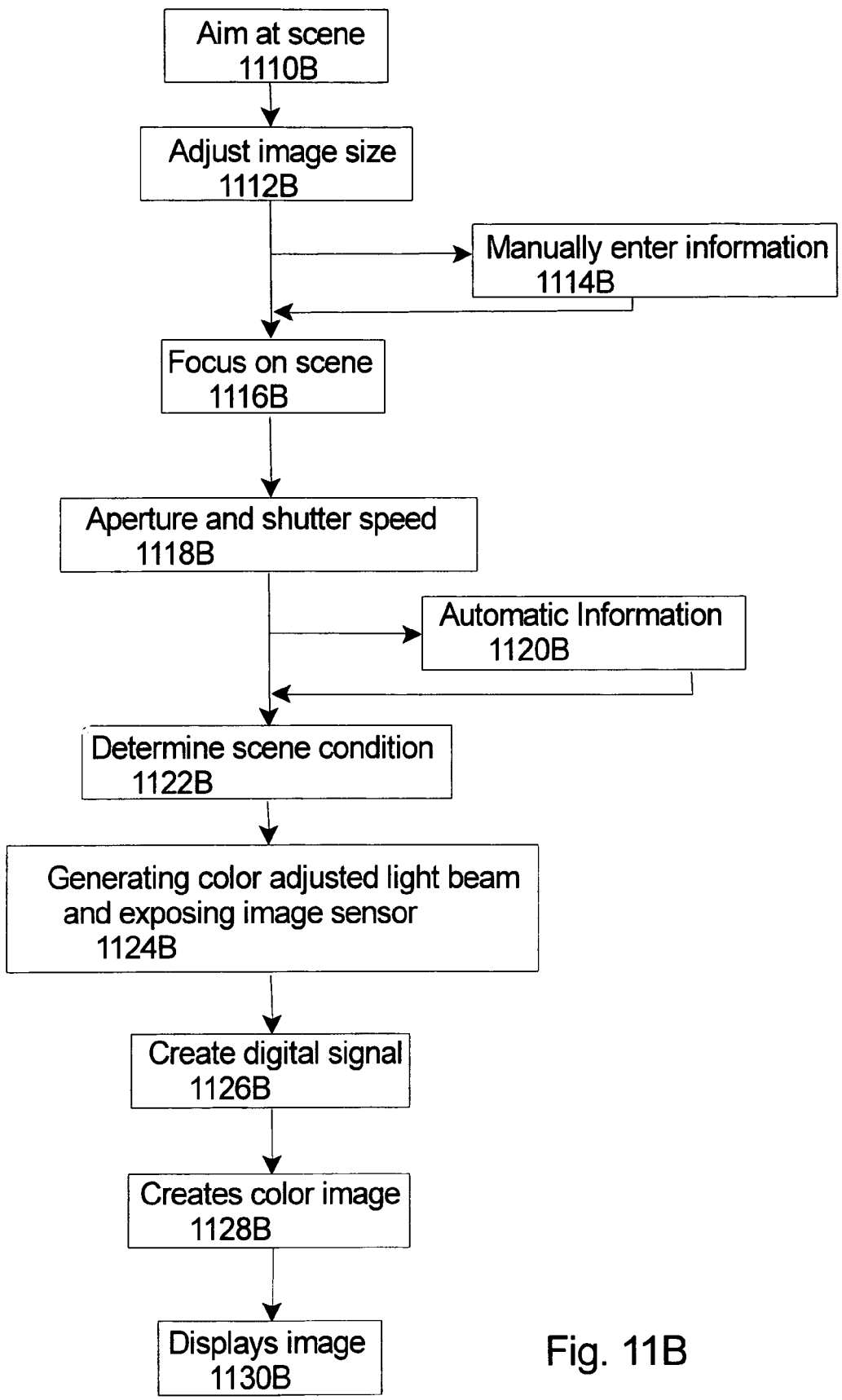
FIG. 11B is another simplified flowchart that illustrates another example of the operation of the image capturing apparatus.

FIG. 11B is a simplified flowchart that illustrates another non-exclusive example of the operation of the image capturing apparatus. It should be noted that one or more of the steps can be omitted or the order of the steps can be switched. First, the image capturing apparatus is aimed toward the scene 1110B. Second, the user adjusts the zoom so as to adjust the size of the image as desired 1112B. Next, the user can manually enter information regarding clarity, apparatus depth AD, separation distance SDist, subject depth SDep, and/or fluid type into the apparatus 1114B. Next, the user presses lightly on the shutter button to enable the image capturing apparatus to automatically focus on the object(s) 1116B. Subsequently, the image capturing apparatus sets the aperture and shutter speed 1118B. Simultaneously, the control system can receive information from one or more sensors relating to clarity, apparatus depth AD, separation distance SDist, and/or fluid type 1120B. Subsequently, the control system determines the scene condition of the scene and the composition of the generated light beam 1122B. Next, the user presses the shutter button all the way, which resets the image sensor, causes the illumination system to generate the color adjusted light beam, and opens the first shutter shade thereby exposing the image sensor to light, building up an electrical charge until the second shutter shade closes thereby preventing further light from reaching the image sensor 1124B. Next, the ADC measures the charge at each photosite of the image sensor and creates a digital signal that represents the values of the charge at each photosite 1126B. Subsequently, the control system interpolates the data from the different photosites, with assistance from the filtering component, to create the color image 1128B. Finally, the image is displayed on the image display 1130B.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image capturing apparatus for providing an image of a subject in a scene within a fluid, the image capturing apparatus comprising:
   an apparatus frame;
   a capturing system for capturing an original image, the capturing system being secured to the apparatus frame;
   a clarity sensor coupled to the apparatus frame, the clarity sensor providing a clarity signal that corresponds to a clarity of at least a portion of the fluid; and
   a control system that utilizes the clarity signal to adjust a color composition of the original image that is captured by the capturing system.

2. The image capturing apparatus of claim 1 wherein the control system calculates an attenuation of light based on the clarity signal and the control system adjusts the color composition of the original image based on the calculated attenuation of light.

3. The image capturing apparatus of claim 1 wherein the control system utilizes at least one of (i) an apparatus depth of the image capturing apparatus, (ii) a separation distance between the image capturing apparatus and the subject of the scene, (iii) a fluid type of the fluid, and (iv) a subject depth of the subject, to adjust a color composition of the original image.

4. The image capturing apparatus of claim 3 wherein the control system calculates an attenuation of light based on the clarity signal and at least one of (i) the apparatus depth, (ii) the separation distance, (iii) the fluid type, and (iv) the subject depth and the control system adjusts the color composition of the original image based on the calculated attenuation of light.

5. The image capturing apparatus of claim 1 further comprising a storage system that stores the image and the clarity signal, the storage system being coupled to the apparatus frame.

6. The image capturing apparatus of claim 5 wherein the storage system also stores at least one of (i) an apparatus depth of the image capturing apparatus, (ii) a separation distance between the image capturing apparatus and the subject of the scene, (iii) a fluid type of the fluid, and (iv) a subject depth of the subject.

7. The image capturing apparatus of claim 1 further comprising an illumination system that generates a first generated light beam having a first color composition and a second generated light beam having a second color composition that is different than the first color composition; and wherein the illumination system generates the first generated light beam when the clarity signal corresponds to a first clarity and the illumination system generates the second generated light beam when the clarity signal corresponds to a second clarity.

8. The image capturing apparatus of claim 7 wherein each of the generated light beams includes at least one of the primary colors.

9. The image capturing apparatus of claim 1 wherein the clarity sensor measures a turbidity of a portion of the fluid.

10. The image capturing apparatus of claim 1 wherein the clarity sensor measures an optical quality of a portion of the fluid.

11. The image capturing apparatus of claim 10 wherein the clarity sensor measures a transmittance of a portion of the fluid.

12. The image capturing apparatus of claim 10 wherein the clarity sensor measures a reflectance of a portion of the fluid.

13. An apparatus for providing an adjusted image of a subject in a scene within a fluid, the apparatus comprising:
   an apparatus frame;
   a capturing system for capturing an original image, the capturing system being secured to the apparatus frame; and
   a control system that receives the original image and information regarding a clarity of the fluid and provides the adjusted image based on the image and the clarity of the fluid, wherein the control system utilizes the clarity signal to adjust a color composition of the original image.

14. The apparatus of claim 13 wherein the control system calculates an attenuation of light based on the clarity signal and the control system adjusts the color composition of the original image based on the calculated attenuation of light.

15. The apparatus of claim 13 wherein the control system utilizes at least one of (i) an apparatus depth of the apparatus frame, (ii) a separation distance between the apparatus frame and the subject of the scene, (iii) a fluid type of the fluid, and (iv) a subject depth of the subject, to adjust a color composition of the original image.

16. The apparatus of claim 13 further comprising a storage system that stores the image and the clarity signal, the storage system being coupled to the apparatus frame.

17. The apparatus of claim 13 further comprising a clarity sensor that measures the clarity of the fluid, the clarity sensor being coupled to the apparatus frame.

18. The apparatus of claim 17 wherein the clarity sensor measures a turbidity of a portion of the fluid.

19. The apparatus of claim 17 wherein the clarity sensor measures an optical quality of a portion of the fluid.

20. An image capturing apparatus for capturing an image of a subject in a scene within a fluid, the apparatus comprising:
an apparatus frame;
a capturing system for capturing the image, the capturing system being secured to the apparatus frame;
an illumination system that generates a generated light beam; and
a control system that receives information regarding a clarity of the fluid and controls a color content of the generated light beam based on the clarity of the fluid, the control system being coupled to the apparatus frame.

21. The image capturing apparatus of claim 20 further comprising a clarity sensor that measures the clarity of the fluid and provides a clarity signal to the control system, the clarity sensor being coupled to the apparatus frame.

22. The image capturing apparatus of claim 21 wherein the clarity sensor measures a turbidity of a portion of the fluid.

23. The image capturing apparatus of claim 21 wherein the clarity sensor measures an optical quality of a portion of the fluid.

24. The image capturing apparatus of claim 21 wherein the control system controls the illumination system to generate (i) a first generated light beam having a first color composition when the clarity signal corresponds to a first clarity, and (ii) a second generated light beam having a second color composition that is different than the first color composition when the clarity signal corresponds to a second clarity.

25. The image capturing apparatus of claim 20 wherein the control system utilizes at least one of (i) an apparatus depth of the apparatus frame, (ii) a separation distance between the apparatus frame and the subject of the scene, (iii) a fluid type of the fluid, and (iv) a subject depth of the subject, to adjust a color content of the generated light beam.

26. A method for capturing an image of a scene within a fluid, the method comprising the steps of:
providing an apparatus frame;
capturing an original image with a capturing system, the capturing system being secured to the apparatus frame;
generating a clarity signal that corresponds to a clarity of a least a portion of the fluid with a clarity sensor, the clarity sensor being coupled to the apparatus frame; and
adjusting the color composition of the original image with a control system based upon the clarity signal.

27. The method of claim 26 further comprising the step of storing the image and the clarity signal with a storage system.

28. The method of claim 26 further comprising the step of generating a first generated light beam having a first color composition and a second generated light beam having a second color composition that is different than the first color composition with an illumination system; and wherein the illumination system generates the first generated light beam when the clarity signal has a first clarity and the illumination system generates the second generated light beam when the clarity signal has a second clarity.

29. A method for capturing an image of a scene within a fluid, the method comprising the steps of:
providing an apparatus frame;
capturing an original image with a capturing system, the capturing system being secured to the apparatus frame; and
providing an adjusted image based on the original image and a clarity of the fluid with a control system, wherein the control system adjusts a color composition of the original image based on the clarity of the fluid.

30. The method of claim 29 further comprising the step of generating a clarity signal that corresponds to the clarity of a least a portion of the fluid with a clarity sensor, the clarity sensor being coupled to the apparatus frame.

31. The method of claim 29 further comprising the steps of: providing a clarity signal that relates to the clarity of the fluid; and storing the original image and the clarity signal with a storage system.

32. A method for capturing an image of a scene within a fluid, the method comprising the steps of:
providing an apparatus frame;
capturing an original image with a capturing system, the capturing system being secured to the apparatus frame; and
generating a first generated light beam having a first color composition and a second generated light beam having a second color composition that is different than the first color composition with an illumination system; and wherein the illumination system generates the first generated light beam when a clarity of the fluid has a first clarity and the illumination system generates the second generated light beam when the clarity has a second clarity.

33. The method of claim 32 further comprising the step of generating a clarity signal that corresponds to the clarity of a least a portion of the fluid with a clarity sensor, the clarity sensor being coupled to the apparatus frame.

34. An image capturing apparatus for providing an image of a subject in a scene within a fluid, the image capturing apparatus comprising:
an apparatus frame;
a capturing system for capturing an original image, the capturing system being secured to the apparatus frame;
a clarity sensor coupled to the apparatus frame, the clarity sensor providing a clarity signal that corresponds to a clarity of at least a portion of the fluid; and
a storage system that stores the image and the clarity signal, the storage system being coupled to the apparatus frame.

35. The image capturing apparatus of claim 34 wherein the storage system also stores at least one of (i) an apparatus depth of the image capturing apparatus, (ii) a separation distance between the image capturing apparatus and the subject of the scene, (iii) a fluid type of the fluid, and (iv) a subject depth of the subject.

36. An image capturing apparatus for providing an image of a subject in a scene within a fluid, the image capturing apparatus comprising:
   an apparatus frame;
   a capturing system for capturing an original image, the capturing system being secured to the apparatus frame;
   a clarity sensor coupled to the apparatus frame, the clarity sensor providing a clarity signal that corresponds to a clarity of at least a portion of the fluid; and
   an illumination system that generates a first generated light beam having a first color composition and a second generated light beam having a second color composition that is different than the first color composition; and wherein the illumination system generates the first generated light beam when the clarity signal corresponds to a first clarity and the illumination system generates the second generated light beam when the clarity signal corresponds to a second clarity.

37. The image capturing apparatus of claim 36 wherein each of the generated light beams includes at least one of the primary colors.

38. An apparatus for providing an adjusted image of a subject in a scene within a fluid, the apparatus comprising:
   an apparatus frame;
   a capturing system for capturing an original image, the capturing system being secured to the apparatus frame; and
   a control system that receives the original image and information regarding a clarity of the fluid and provides the adjusted image based on the image and the clarity of the fluid, wherein the control system utilizes at least one of (i) an apparatus depth of the apparatus frame, (ii) a separation distance between the apparatus frame and the subject of the scene, (iii) a fluid type of the fluid, and (iv) a subject depth of the subject, to adjust a color composition of the original image.

39. An apparatus for providing an adjusted image of a subject in a scene within a fluid, the apparatus comprising: an apparatus frame; a capturing system for capturing an original image, the capturing system being secured to the apparatus frame; a control system that receives the original image and information regarding a clarity of the fluid and provides the adjusted image based on the image and the clarity of the fluid; and a storage system that stores the image and the information regarding a clarity fluid, the storage system being coupled to the apparatus frame.

40. A method for capturing an image of a scene within a fluid, the method comprising the steps of:
   providing an apparatus frame;
   capturing an original image with a capturing system, the capturing system being secured to the apparatus frame;
   generating a clarity signal that corresponds to a clarity of a least a portion of the fluid with a clarity sensor, the clarity sensor being coupled to the apparatus frame; and
   storing the image and the clarity signal with a storage system.

41. A method for capturing an image of a scene within a fluid, the method comprising the steps of:
   providing an apparatus frame;
   capturing an original image with a capturing system, the capturing system being secured to the apparatus frame;
   generating a clarity signal that corresponds to a clarity of a least a portion of the fluid with a clarity sensor, the clarity sensor being coupled to the apparatus frame; and
   generating a first generated light beam having a first color composition and a second generated light beam having a second color composition that is different than the first color composition with an illumination system, wherein the illumination system generates the first generated light beam when the clarity signal has a first clarity and the illumination system generates the second generated light beam when the clarity signal has a second clarity.

42. A method for capturing an image of a scene within a fluid, the method comprising the steps of: providing an apparatus frame; capturing an original image with a capturing system, the capturing system being secured to the apparatus frame; providing an adjusted image based on the original image and a clarity of the fluid with a control system; providing a clarity signal that relates to the clarity of the fluid; and storing the original image and the clarity signal with a storage system.

* * * * *

UNITED STATES PATENT AND TRADEMARK OFFICE
CERTIFICATE OF CORRECTION

| | | |
|---|---|---|
| PATENT NO. | : 7,710,465 B2 | Page 1 of 1 |
| APPLICATION NO. | : 11/645299 | |
| DATED | : May 4, 2010 | |
| INVENTOR(S) | : Mark Takita | |

It is certified that error appears in the above-identified patent and that said Letters Patent is hereby corrected as shown below:

In the Claims:

Column 22, Line 4, after "clarity" please insert -- of the --.

Signed and Sealed this

Tenth Day of August, 2010

David J. Kappos
*Director of the United States Patent and Trademark Office*